United States Patent
Sahm, III

(10) Patent No.: US 9,414,677 B2
(45) Date of Patent: Aug. 16, 2016

(54) IMPACT BARRIER FOR A STORAGE RACK

(71) Applicant: Southwest Agri-Plastics, Inc., Addison, TX (US)

(72) Inventor: Victor A. Sahm, III, Dallas, TX (US)

(73) Assignee: Southwest Agri-Plastics, Inc., Addison, TX (US)

( * ) Notice: Subject to any disclaimer, the term of this patent is extended or adjusted under 35 U.S.C. 154(b) by 0 days.

(21) Appl. No.: 13/743,165

(22) Filed: Jan. 16, 2013

(65) Prior Publication Data

US 2014/0197295 A1 Jul. 17, 2014

(51) Int. Cl.
*A47B 95/04* (2006.01)
*B65G 1/02* (2006.01)
*A47B 96/14* (2006.01)

(52) U.S. Cl.
CPC .............. *A47B 95/043* (2013.01); *B65G 1/02* (2013.01); *A47B 96/14* (2013.01); *B65G 2207/40* (2013.01)

(58) Field of Classification Search
CPC .............. A47B 13/083; A47B 95/043; A47B 2095/46; A47B 96/14; E01F 15/0469; E01F 15/141; B65G 1/02; B65G 2207/40; B65D 81/053; B65D 81/054; B65D 81/055; B65D 81/056; B65D 81/057; B65D 81/058
USPC ......... 248/345.1, 345, 229.16, 229.26, 230.6, 248/231.81, 74.2, 615, 220.21, 223.31, 248/222.11, 223.41, 224.7, 228.1, 228.8, 248/230.1, 230.7; 211/183, 191; 108/27; 293/142; 428/99, 122, 188; 206/586, 206/591, 594, 453
See application file for complete search history.

(56) References Cited

U.S. PATENT DOCUMENTS

| 1,903,541 | A | * | 4/1933 | Bailey ........................... 428/102 |
| 3,446,345 | A | | 5/1969 | Frosoy |
| 4,106,739 | A | | 8/1978 | Gasser |
| 4,482,054 | A | * | 11/1984 | Gardner ................. B65D 81/05 206/320 |
| 4,483,444 | A | * | 11/1984 | Gardner ................. B65D 81/05 206/320 |
| 5,131,669 | A | | 7/1992 | Kinnamon et al. |
| D333,900 | S | * | 3/1993 | Kinnamon ................... D12/168 |
| 5,277,387 | A | * | 1/1994 | Lewis et al. .................. 248/74.2 |
| 5,369,925 | A | | 12/1994 | Vargo |
| 5,701,635 | A | | 12/1997 | Hawkes |
| RE35,971 | E | * | 11/1998 | Kessler ......................... 428/100 |

(Continued)

FOREIGN PATENT DOCUMENTS

| CA | 2213109 A1 | 2/1999 |
| EP | 0904988 A2 | 3/1999 |

(Continued)

*Primary Examiner* — Jonathan Liu
*Assistant Examiner* — Guang H Guan
(74) *Attorney, Agent, or Firm* — Gardere Wynne Sewell LLP

(57) ABSTRACT

An impact barrier for a storage rack support structure includes an arcuate outer wall having opposed first and second ends, the first and second ends being spaced apart to form a gap therebetween. The impact barrier further includes a first deflection element, a second deflection element, and a third deflection element, wherein the third deflection element is position between the first and second deflection elements. The first deflection element extends from the first end to a first medial position on the outer wall between the first end and the third deflection element, and the second deflection element extends from the second end to a second medial position on the outer wall between the second end and the third deflection element. Upon impact, the first, second and third deflection elements deform to dissipate the energy generated by the impact.

19 Claims, 2 Drawing Sheets

(56) References Cited

U.S. PATENT DOCUMENTS

| | | | |
|---|---|---|---|
| 6,025,047 A | 2/2000 | Catta et al. | |
| 6,044,601 A * | 4/2000 | Chmela | E04F 19/028 248/345.1 |
| 6,234,314 B1 * | 5/2001 | Qiu et al. | 206/586 |
| 6,289,836 B1 | 9/2001 | Tellex | |
| 6,881,469 B2 * | 4/2005 | Hightower | B65D 81/055 206/453 |
| 7,090,428 B2 * | 8/2006 | Hinojosa | 404/6 |
| 7,128,214 B2 * | 10/2006 | Qiu | B65D 81/054 206/586 |
| 7,575,391 B2 * | 8/2009 | Tarazona de La Asuncion | 404/6 |
| 7,770,861 B2 | 8/2010 | Huxtable et al. | |
| 8,033,057 B2 * | 10/2011 | Krause et al. | 49/441 |
| 8,267,262 B2 * | 9/2012 | Thelwell | A47B 95/043 211/183 |
| 2002/0053664 A1 | 5/2002 | Moore | |
| 2009/0022937 A1 * | 1/2009 | Wallace | 428/99 |
| 2010/0025272 A1 * | 2/2010 | Stau et al. | 206/349 |
| 2011/0284710 A1 * | 11/2011 | Wallace et al. | 248/345.1 |
| 2014/0196997 A1 * | 7/2014 | Michael | E01F 15/141 188/377 |
| 2014/0197295 A1 * | 7/2014 | Sahm, III | A47B 95/043 248/345.1 |

FOREIGN PATENT DOCUMENTS

| | | |
|---|---|---|
| WO | WO-8600051 A1 | 1/1986 |
| WO | WO-9117320 A1 | 11/1991 |

* cited by examiner

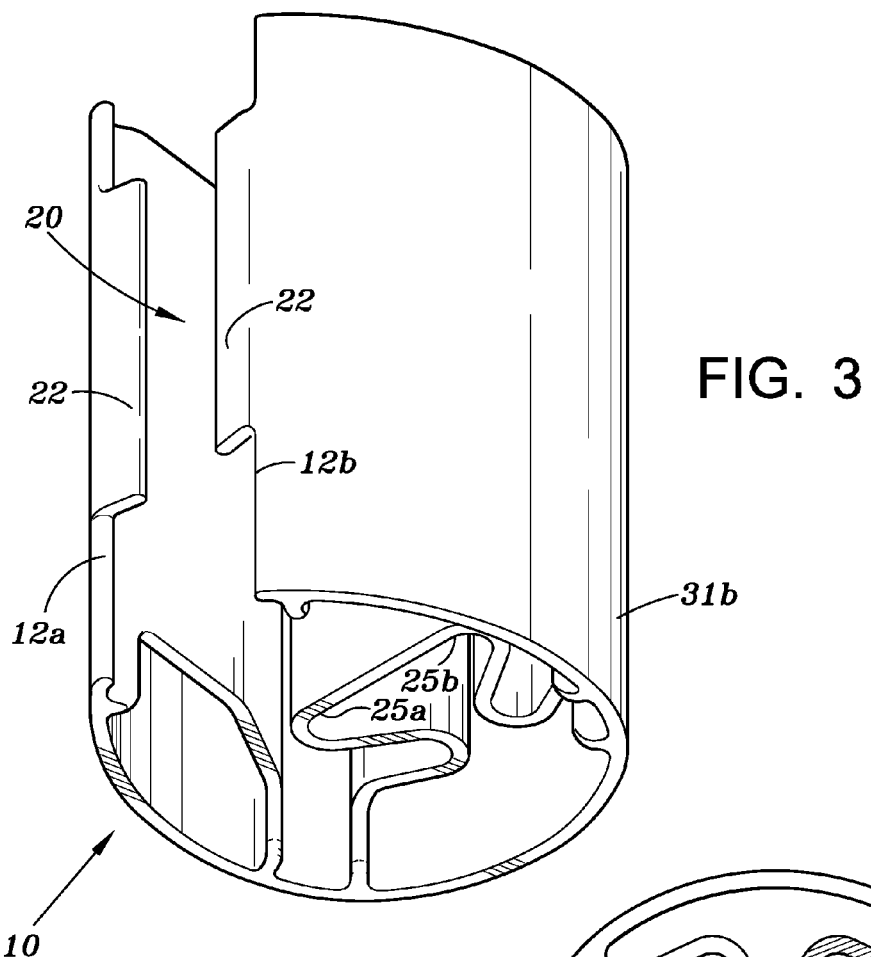
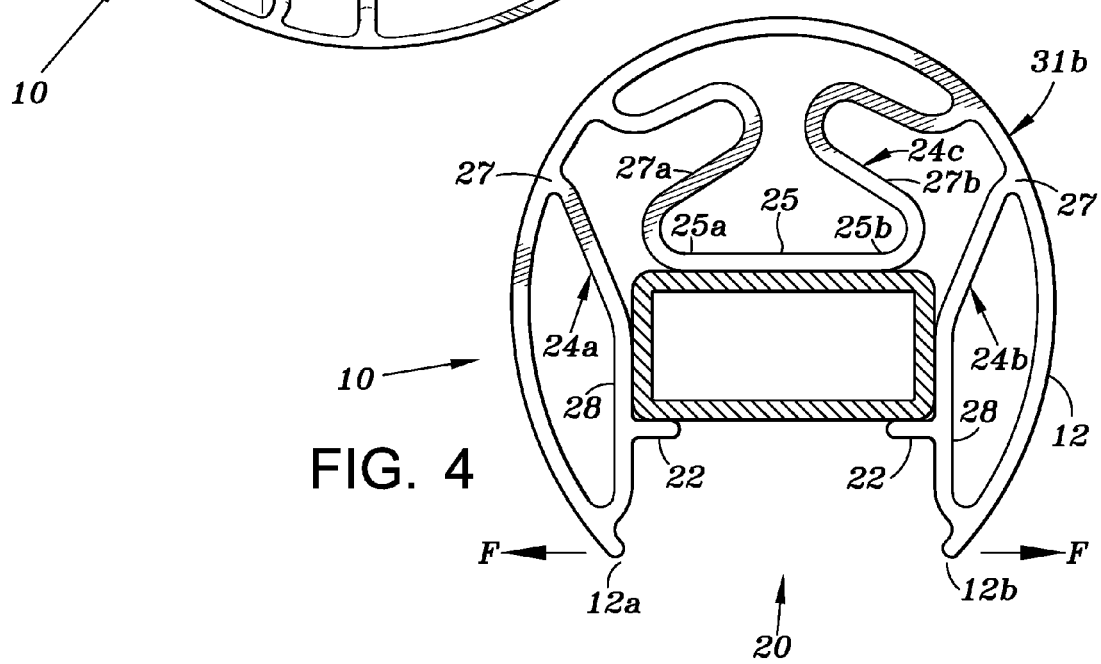

IMPACT BARRIER FOR A STORAGE RACK

CROSS REFERENCE TO RELATED APPLICATIONS

None.

BACKGROUND

Support structures, such as for example, warehouse storage racks, upright supports, standing frames or columns are frequently subject to damage from contact by fork-lifts or other types of moving vehicles.

While protective barrier guards and/or guide rails, for example, may be useful to protect the support member from contact by a moving vehicle, these safeguards are distant and removed from the support member itself and do not offer protection when the support has received a direct impact load. It is known that a direct impact may compromise the strength of the support resulting in an increased risk of collapse as well as a risk of injury to nearby persons. In addition to repair and/or replacement costs, such damage undoubtedly results in a general disruption in the business at hand (e.g., requiring the use of temporary storage facilities, legal expenses connected with the defense of actions resulting from an accident). Thus, there remains a need for protecting exposed surfaces of a storage rack, support or similar upright structure against impact damage.

SUMMARY

Described herein are improvements for protecting one or more exposed surfaces of a structure such as, for example, a storage rack, support or similar upright structure.

According to one embodiment, an impact barrier for a storage rack support structure includes an outer wall having opposed first and second ends, wherein the first and second ends are spaced apart to form a gap. The barrier further includes a first deflection element, a second deflection element, and a third deflection element, wherein the third deflection element is positioned between the first and second deflection elements. The first deflection element extends from the first end to a first medial position on the outer wall between the first end and the third deflection element. The second deflection element extends from the second end to a second medial position on the outer wall between the second end and the third deflection element. The first and second deflection elements are non joining elements. In addition, the first and second deflection elements are not contiguous with the third deflection element. In response to an impact, at least one of the first, second or third deflection elements deform to dissipate the energy generated from the impact.

According to another embodiment of the invention, the impact barrier includes a first hinge disposed between the first medial position and the third deflection element and a second hinge disposed between the second medial position and the third deflection element. Said first, second, and third deflection elements each have first and second ends. The first and second ends of each first, second and third deflection element are contiguous with an outer wall of the barrier. In one or more embodiments, the first and second hinges facilitate movement of the first and second ends between a locked position to secure the protector to the storage rack and an unlocked position. In one or more embodiments, the first and second hinges enable expansion of the gap to facilitate attachment and removal of the impact barrier from the support structure.

Generally, with the described embodiments, the outer wall is arcuate. The third deflection element may comprise a pair of connecting segments extending between the outer wall and a base portion, the base portion positioned to abut a support structure. The first and second deflection elements each include a planar segment positioned to abut and otherwise frictionally contact the support structure. One of the deflection elements is centrally positioned and generally has a larger surface area than other deflection elements. At least one of the deflection elements may have a surface area that is at least about twice a surface area of any of the other deflection elements. The length of the outer wall is often about 1.5 times the cross-sectional diameter of the barrier. At least one of the deflection elements will abut a front surface of the support structure. In one or more of the described embodiments, at least a portion of each deflection element may include a planar segment having a surface that abuts the support structure. In some embodiments, a grip may be positioned at or adjacent one or more of the first end of the outer wall, the second end of the outer wall and/or on at least some of the spaced apart deflection elements.

Still further as described herein is a method of making a device for positioning on an upright, the method comprising: providing a two-part mold of the device; pouring a plastic material into the mold; allowing the plastic material to set; and ejecting four to five inches of the mold.

These and other embodiments and features and the advantages thereof, will become readily apparent from the following description, taken in conjunction with any exemplary representations, drawings and/or example.

BRIEF DESCRIPTION OF THE DRAWINGS

For more complete understanding of the features and advantages described herein, reference is now made to a description along with accompanying figures, wherein

FIG. 3 is an alternate perspective view of the impact barrier of FIG. 1; and

FIG. 4 is top plan view of another impact barrier described herein.

DETAILED DESCRIPTION

Figure 1:
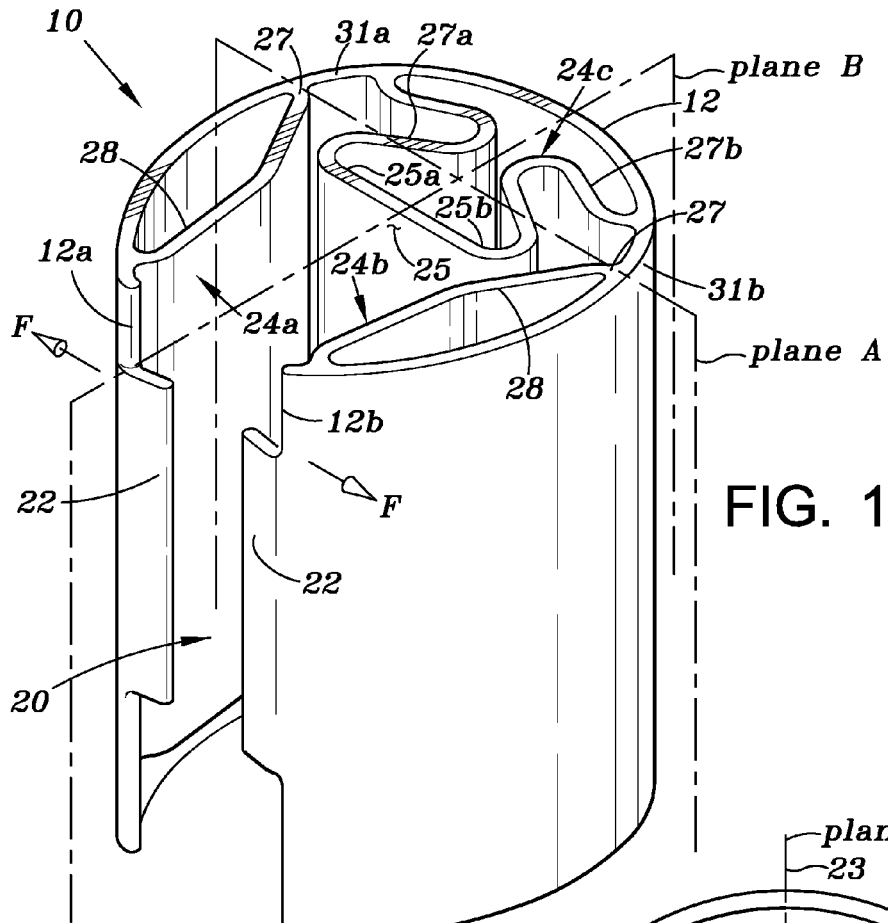
FIG. 1 is an illustration of an impact barrier for a storage rack support structure.
Figure 2:
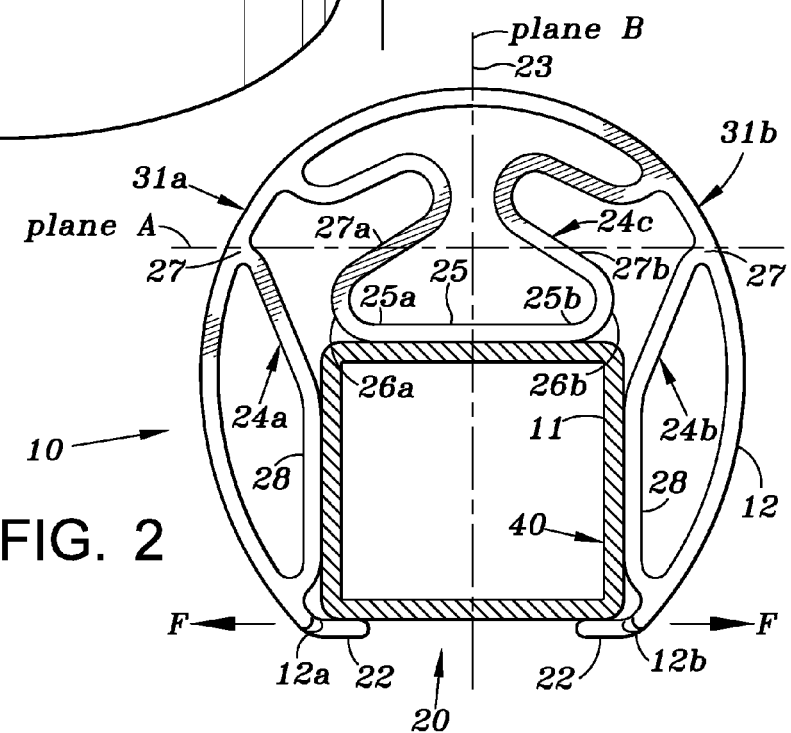
FIG. 2 is top plan view of the impact barrier of FIG. 1.

In the embodiments illustrated in FIGS. 1 and 2, an impact barrier member 10 is employed to advantage and protect, for example, a warehouse storage rack, upright support, frame, column or other support structure, against damaging impact forces. For example, in the event a fork lift or other moving vehicle contacts a support structure 11 (FIG. 2), the barrier member 10 deforms upon contact and otherwise absorbs the impact energy that results from the impact force, thereby preventing or otherwise reducing the likelihood of damage to the support structure 11.

In the embodiment illustrated in FIGS. 1 to 4, barrier member 10 includes an outer arcuate wall 12, deflection elements 24a, 24b, and 24c and living hinges 31a and 31b. As discussed in greater detail below, living hinges 31a and 31b facilitate ease of installation and removal of barrier member 10 from the support structure 11. In the figures, the outer wall 12 arcuately extends from a first end 12a to a second end 12b. The first and second ends 12a and 12b are preferably spaced apart a predetermined distance, which forms a gap 20, to enable the barrier member 10 to fit around and frictionally secure to or around the support structure 11. Preferably and in some embodiments, the outer wall 12 is generally c-shaped; however, it should be understood that outer wall 12 may be otherwise shaped (i.e., rectangular, square, etc.).

Deflection elements 24a and 24b each reside and extend from the ends 12a and 12b, respectively, to intermediate junctions 27, which are located at a medial point along arcuate wall 12. As such, deflection elements 24a and 24b are, respectively, contiguous with a portion of arcuate wall 1Z and are not contiguous with each other or with any other deflection element. In FIGS. 1, 2, and 4, the deflection elements 24a and 24b each have a similar shape and surface area; however, it should be understood that the deflection elements 24a and 24b may have different surface areas and/or shapes. Preferably, each of the deflection elements 24a and 24b contain at least a first segment 28 having a planar region that is positioned to abut and otherwise frictionally contact at least a portion of the vertical or horizontal support structure 11 around which the barrier member 10 is positioned, and the planar region is disposed beyond a plane A that extends through intermediate junctions 27, and the planar region extends through a plane B formed by a dividing line 23 that divides the outer wall into a first half and a second half, as best illustrated in FIGS. 1, 2 and 4.

The deflection element 24c is formed of a base portion 25 and two connecting segments 27a and 27b. The connecting segments 27a and 27b extend from the outer arcuate wall 12 to respective ends 25a and 25b of base portion 25. In the figures, base portion 25 and first segments 28 of deflection elements 24a and 24b define or otherwise provide a bounded region 40 in the interior of the impact barrier 10 to receive the support structure 11. Between ends 25a and 25b of base portion 25 and a neighboring segment 28 are non-contiguous portions or gaps, such as a gap between base portion 25 at end 25a and neighboring and non joining segment 28 or a gap between base portion 25 at end 25b and neighboring and non joining segment 28. As illustrated in FIGS. 1 and 2, the overall shape of the bounded region 40 generally conforms to the overall shape of the support structure 11 on which the impact barrier 10 is positioned. Also, in one or more embodiments, support structure 11 is generally bounded by and in contact with impact barrier 10 at a least a portion of each of deflection elements 24a, 24b and 24c. In some embodiments, each of deflection elements 24a, 24b and 24c include at least one planar portion that assists in providing the bounded region 40. In some embodiments, the planar portion may be flat and also arcuate or curved. As depicted in FIGS. 1 and 2, the arrangement of first segments 28 and base portion 25 forms a generally square shaped region; however, it should be understood that the base portion 25 and the first segments 28 can be arranged in any configuration, such as, for example, a rectangular configuration, an oval shaped configuration, a polygonal, a circular configuration or any other shape to conform to the cross sectional shape of the support structure 11, as represented in FIG. 4.

Referring specifically to FIGS. 1 and 2, the connecting segments 27a and 27b are generally curvilinear segments, such as, for example, "S" shaped, and have a first end portion 26a, and a second end portion 26b. However, it should be understood that the connecting segments 27a and 27b may be otherwise shaped (straight or c-shaped, z-shaped, n-shaped, m-shaped, etc. and may be thicker, for example). Furthermore, as depicted in FIGS. 1 and 2, the drawings illustrate two connecting segments 27a and 27b; however, it should be understood that a greater or fewer number of the connecting segments may be utilized. It should be understood, however, that other suitable arrangements may be made that provide energy absorption as a result of an impact load thereby reducing transfer of energy to the vertical or horizontal support structure 11 after impact to the impact barrier 10.

As illustrated in FIGS. 1 and 2, living hinges 31a and 31b are disposed and extend respectively between the deflection element 24a and connecting segment 27a and the deflection element 24b and connecting segment 27c. The hinges 31a and 31b are of a selected thickness to withstand impact forces while also enabling sufficient flexibility to permit the gap 20 to expand, facilitating the installation and removal of the impact barrier 10 around the support structure 11. Flexibility of the living hinge is likely improved with the non contiguous nature of the deflection elements. When installing barrier 10 around the support structure 11, a force F can be applied to ends 12a and 12b to enable the gap 20 to expand, such as to a less engaged or unlocked position, which will allow the support structure 11 to either be inserted within the bounded region 40 or removed therefrom. When the force F is removed from the ends 12a and 12b, living hinges 31a and 31b facilitate the return of the ends to their original or engaged or "locked" position to enable a frictional engagement of the barrier 10 to the support structure 11 (i.e., surfaces of first segments 28 and the base portion 25 frictionally engage the support structure 11 at its outer surface). The impact barrier 10 is typically positioned such that the gap 20 is proximate to a surface opposed or away from a front or exposed surface of the support structure 11 or otherwise opposite the surface of the support structure 11 that typically receives the impact.

In the embodiment illustrated in FIGS. 1 and 2, a grip 22 is optionally positioned to extend into or provide an additional boundary region for gap 20, said extension arising from each respective end 12a and 12b. Additionally or alternatively, a grip 22 may extend from any position along deflection elements 24a and 24b, which accommodates smaller support structures 11 or alternatively shaped support structures not shown. A representative extension positioned along first segments 28 is depicted in FIGS. 3 and 4. It should be understood that the grips 22 may vary in size, positioning and overall length and remain sufficient to enable the barrier member 10 to be positioned on and otherwise secured around the portion of the vertical or horizontal structure 11.

Generally, the outer wall 12 extends a length that is greater than its cross sectional diameter. For example, in some embodiments, the length of the outer wall 12 is 1.5 times a cross sectional diameter of the outer arcuate wall 12. In some embodiments, deflection elements 24a, 24b, and 24c may be at a different elevation than that of the outer wall 12, thereby forming a recessed region on one or both opposing longitudinal ends of barrier member 10, as representatively depicted in FIG. 3, in which a recessed region is formed at the lower longitudinal end of barrier member 10. The at least one recessed portion is often included to accommodate bolts or other mounting elements that are fitted with or are on the vertical or horizontal structure 11.

In use, the impact barrier 10 serves as a bumper or protector, protecting the portion of the support structure 11 on which it is positioned. It should be understood that one or a number of the impact barriers 10 may be stacked or otherwise adjacently positioned along any portion of the support structure 11, typically where damage is likely to occur. In particular, the impact barrier(s) 10 may be positioned adjacent one another, at intervals, and/or at any of a number of impact points, as desired. When more than one impact barrier 10 is adjacent another, the impact barriers 10 may be fitted, when desired, or otherwise secured together via a snap fit or other type of locking arrangement or mechanism. It should be understood that a single impact barrier 10 or plurality of impact barriers 10 do not require anchoring to the structure or anchoring to the ground or anchoring to each other. Furthermore, each impact barrier 10 does not require a tool for positioning on the support structure 11. In addition, each impact barrier 10 frictionally engages the support structure 11 and thus, does not require a belt, strap or closure once positioned on the portion of the vertical or horizontal structure.

Preferably, the impact barrier 10 is made of a material capable of hardening, such as a hardenable plastic or hardenable polymer blend. In one embodiment, the impact barrier 10 is formed of polypropylene. In the alternative, impact barrier 10 is formed of polyethylene, polycarbonate, polyvinylchloride, polystyrene or a mixture thereof, although other suitable hardenable plastics may be used as desired. The impact barrier 10 may optionally include a surface coating, weatherproofing, waterproofing, or an added scratch or stain or UV resistance covering or finish. The exterior surface of the impact barrier 10 may also be decorated with additional markings (e.g., advertising, strident marks) or finish. Furthermore, the exterior surface may include an embossment or a debossment, as desired.

The impact barrier 10, when molded, may be formed using a high visibility color in accordance with the Storage Equipment Manufacturer's Association (SEMA) code of practice. The impact barrier 10 is preferably formed using an injection molding process incorporating a two-part mold, one of which is a stationary part and another of which is a moveable part. Because of the length of the impact barrier 10 described herein, which in one embodiment is at or about 9 inches or may be greater than 9 inches (a length that is not easy to prepare for one of ordinary skill), one or more adjustments have been included with the method of making a member described herein in order to successfully arrive at a fully formed and useful member. The process adjustments include increasing the stroke, increasing the number of ejector pins, and/or increasing the knockout bar.

The impact barrier 10, when molded, is shaped to absorb an impact force. In addition, the impact barrier 10 is shaped to dissipate an impact force in more than one direction. Moreover, the impact barrier 10 may be further adjusted and modified to add additional force dissipation and to alleviate deflection of impact forces to the structure itself. For example, the shape of deflection elements 24a, 24b, and/or 24c may be modified in shape to include more surface area.

In some embodiments, the length of the member described herein is about nine inches and the cross sectional diameter (taken with a measurement line passing through the center of the base member 25, as depicted in FIG. 2) is about six inches.

In one or more forms, when the outer shell 12 receives an impact, the deflection element(s) 24a, 24b, 24c nearest the compressive force are bent or otherwise deformed. The deflection element(s) 24a, 24b and/or 24c are provided to absorb and dissipate the compressive impact force in more than one direction, so that the impact force will not damage the support member 11. Generally, the deflection element(s) 24a, 24b and/or 24c are also arranged to absorb and dissipate the compressive impact force in more than one direction and not directly to one another in view of their non-contiguous configuration.

To meet the requirements for protecting a rack leg against a forklift (which requires a protection of 15¼ inches), only two members described herein would be required to be positioned side by side or in a stacking relationship on the rack leg when each member is at or about 9 inches in length.

Although representative processes and articles have been described in detail herein, those skilled in the art will recognize that various substitutions and modifications may be made without departing from the scope and spirit of what is described and defined by the appended claims.

What is claimed is:

1. An impact barrier for a storage rack support structure, the impact barrier comprising:
    an outer wall forming an interior space of the impact barrier to receive at least a portion of the storage rack support structure therein, the outer wall having a first end and a second end opposing the first end, wherein the first and second ends are spaced apart to form a gap therebetween;
    a first deflection element;
    a second deflection element; and
    a third deflection element,
    wherein the third deflection element is positioned between the first and second deflection elements, and is formed by a first connecting segment and a second connecting segment, each formed integrally and continuously with the outer wall, and a planar base portion extending between the first and second connecting segments, the first and second connecting segments providing respectively a first intersection and a second intersection joining the third deflection element with the outer wall, the first connecting segment having a first end portion, and the second connecting segment having a second end portion, each of the first end portion and the second end portion continuously and integrally joining an end of the planar base portion, such that the planar base portion is formed only between the first end portion and the second end portion, and the planar base portion extends through a first plane formed by a dividing line that divides the outer wall into a first half and a second half;
    wherein the first deflection element extends inwardly from a first position on the outer wall near or at the first end, and joins integrally and continuously with the outer wall at a second position between the first position and the third deflection element, the first deflection element containing two generally planar segments with ends intersecting obtusely in the interior space of the impact barrier;
    wherein the second deflection element extends inwardly from a third position on the outer wall near or at the second end, and joins integrally and continuously with the outer wall at a fourth position between the third position and the third deflection element, the second deflection element containing two generally planar segments with ends intersecting obtusely in the interior space of the impact barrier;
    wherein the third deflection element extends inwardly from the outer wall into the interior space, and through a second plane extending across the second position and the fourth position such that the planar base portion is disposed beyond the second plane toward the first and second ends of the outer wall;
    wherein upon impact, at least one of the first, second and third deflection elements deforms to dissipate energy generated from the impact.

2. The impact barrier of claim 1, wherein a first hinge of the outer wall and a second hinge of the outer wall facilitate movement of the first and second ends between a locked position, to secure the impact barrier to the storage rack support structure, and an unlocked position, to facilitate attachment or removal of the impact barrier from the storage rack support structure,
    the first hinge being disposed between the first deflection element and the first connecting segment of the third deflection element, and the second hinge being disposed between the second deflection element and the second connecting segment of the third deflection element.

3. The impact barrier of claim 1, wherein the outer wall is arcuate.

4. The impact barrier of claim 1, wherein the first and second deflection elements are symmetrical.

5. The impact barrier of claim 1, wherein one of the two generally planar segments of the first deflection element, and one of the two generally planar segments of the second deflection element, each are configured to abut and otherwise frictionally contact the storage rack support structure.

6. The impact barrier of claim 1, wherein the third deflection element has a larger surface area than the first and second deflection elements.

7. The impact barrier of claim 1, wherein a length of the outer wall is about 1.5 times a cross-sectional diameter of the impact barrier.

8. The impact barrier of claim 1, wherein any one or more of the first, second and third deflection elements is for abutting a surface of the storage rack support structure.

9. The impact barrier of claim 1 further comprising a grip positioned at (a) the first end, (b) the second end, (c) each of the first and second ends, (d) the first deflection element, (e) the second deflection element, or (f) each of the first and second deflection elements.

10. The impact barrier of claim 1, wherein at least one of the first, second, and third deflection elements has a surface area that is at least about twice a surface area of remaining deflection elements.

11. The impact barrier of claim 1, wherein the first plane formed by the dividing line is perpendicular to the planar base portion.

12. An impact barrier for a support structure, comprising:
an arcuate outer wall having a first end and a second end opposing the first end, the arcuate outer wall forming an interior area to receive the support structure, wherein the first and second ends are spaced apart to form a gap therebetween;
a first deflection element, a second deflection element, and a third deflection element, each of the first and second and third deflection elements extending inwardly from the arcuate outer wall into the interior area, wherein the third deflection element is positioned between the first and second deflection elements;
the first deflection element extending from the first end to a first medial position on the arcuate outer wall between the first end and the third deflection element, the first deflection element continuously and integrally joining the arcuate outer wall at the first medial position, the first deflection element containing two generally planar segments with ends intersecting obtusely in the interior area of the impact barrier;
the second deflection element extending from the second end to a second medial position on the arcuate outer wall between the second end and the third deflection element, the second deflection element continuously and integrally joining the arcuate outer wall at the second medial position, the second deflection element containing two generally planar segments with ends intersecting obtusely in the interior area of the impact barrier;
the third deflection element having a first connecting segment, a second connecting segment, and a planar base portion extending between the first and second connecting segments, the first and second connecting segments each formed integrally and continuously with the arcuate outer wall for joining the third deflection element with the arcuate outer wall at a position spaced apart from the first medial position, and from the second medial position, the third deflection element further extending into the interior area and through a first plane extending across the first medial position and the second medial position such that the planar base portion is disposed beyond the first plane toward the first and second ends of the arcuate outer wall, the planar base portion extending through a second plane formed by a dividing line that divides the arcuate outer wall into a first half and a second half, the first connecting segment having a first end portion continuously and integrally joining a first end of the planar base portion, the second connecting segment having a second end portion continuously and integrally joining a second end of the planar base portion, such that the planar base portion is formed between the first end portion and the second end portion;
a first hinge of the arcuate outer wall disposed between the first medial position and the third deflection element; and
a second hinge of the arcuate outer wall disposed between the second medial position and the third deflection element; and
wherein the first and second hinges are flexible to enable expansion of the gap to facilitate attachment or removal of the impact barrier from the support structure.

13. The impact barrier of claim 12, wherein at least a portion of each deflection element has a surface for abutting the support structure.

14. The impact barrier of claim 12, wherein the third deflection element includes a larger surface area than one of the first and second deflection elements.

15. The impact barrier of claim 12 further including a grip extending from the first and second ends of the arcuate outer wall to secure the impact barrier to the support structure.

16. The impact barrier of claim 12, wherein the first, second and third deflection elements form a bounded region for receiving the support structure therein.

17. The impact barrier of claim 12, wherein the second plane formed by the dividing line is perpendicular to the planar base portion.

18. The impact barrier of claim 12, wherein one or more of the first hinge and the second hinge facilitate movement of the first and second ends of the arcuate outer wall, the movement being between a locked position, to secure the impact barrier to the support structure, and an unlocked position, to facilitate attachment or removal of the impact barrier from the support structure.

19. The impact barrier of claim 12, wherein the planar base portion of the third deflection element is positioned to abut the support structure.

* * * * *